Sept. 7, 1926.
C. H. BROWN
1,598,708
FISHING TOOL
Original Filed Nov. 23, 1923    2 Sheets-Sheet 1
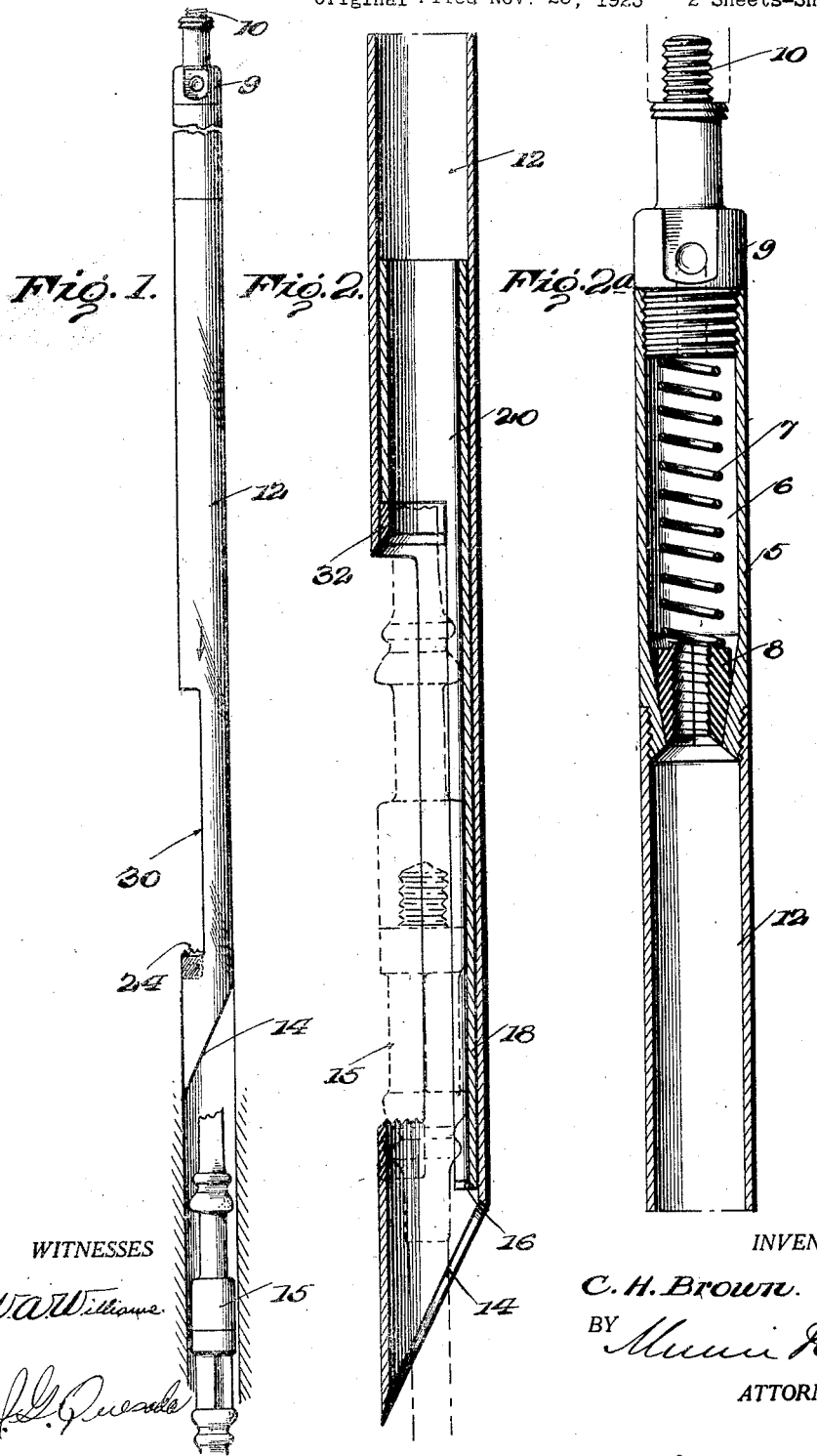
WITNESSES
INVENTOR
C. H. Brown.
BY
ATTORNEYS Sept. 7, 1926.  
C. H. BROWN  
FISHING TOOL  
Original Filed Nov. 23, 1923   2 Sheets-Sheet 2
1,598,708
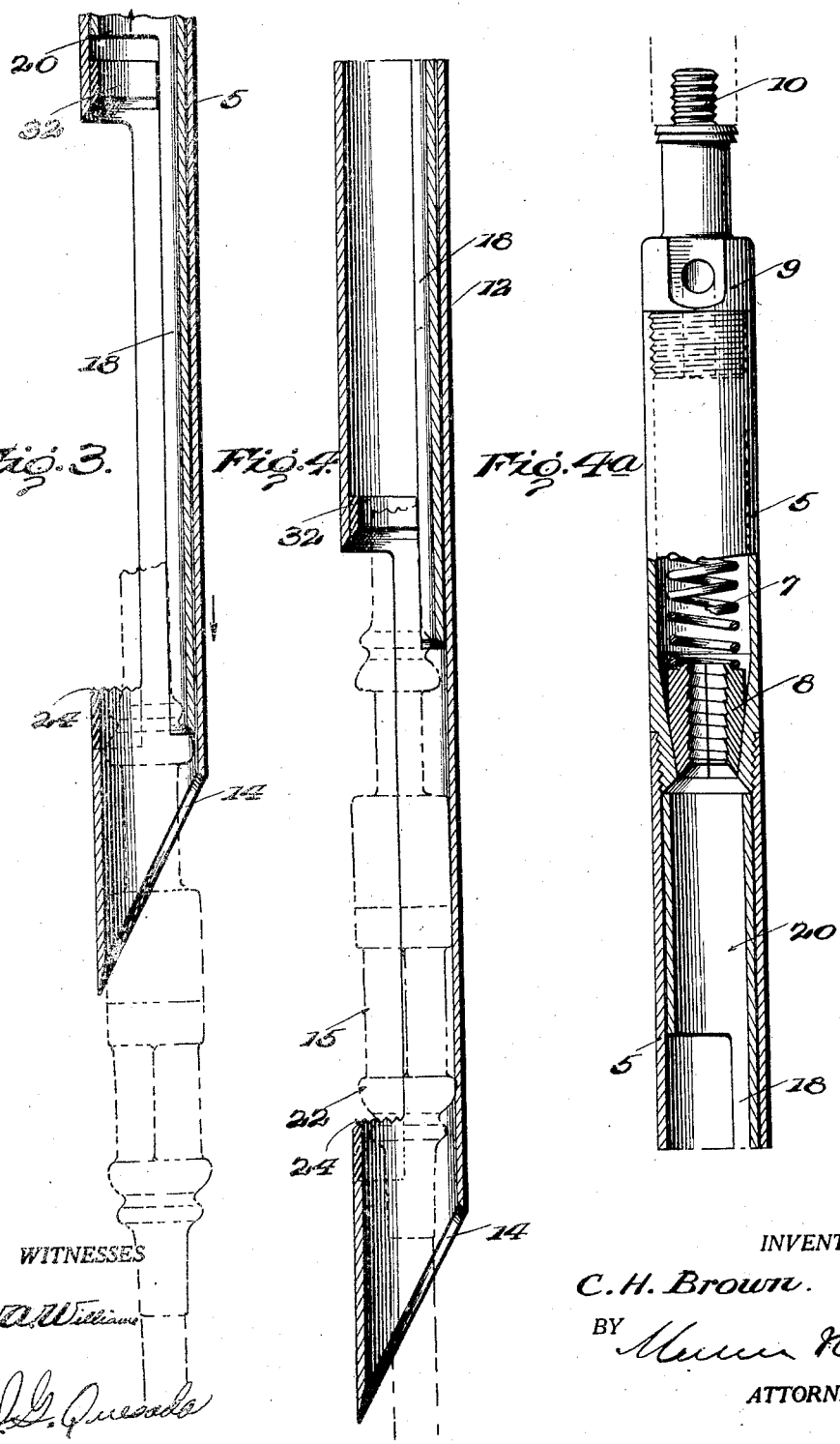
WITNESSES
INVENTOR  
C. H. Brown.  
BY  
ATTORNEYS Patented Sept. 7, 1926.

1,598,708

UNITED STATES PATENT OFFICE.

CHARLES HENRY BROWN, OF BRECKENRIDGE, TEXAS.

FISHING TOOL.

Application filed November 23, 1923, Serial No. 676,609. Renewed October 20, 1925.

This invention relates to fishing tools especially adapted for use in wells.

Briefly stated an important object of this invention is to provide a tool having novel means to securely grip the sucker rod at the box of the same or in case the box is broken off at the shank or plain portion of the sucker rod.

Also one of the most important objects of the invention is to provide a sucker rod fishing tool in which the lower end of the same is beveled to form what might be said to be a scoop designed to straighten the broken sucker rod or the like preparatory to engaging the sucker rod with the gripping means of the tool.

Also the invention aims to provide a fishing tool in which simple means is provided to prevent the sucker rod box or other part of the sucker rod from bursting or unduly straining the tool during withdrawal of the sucker rod from the tubing.

Further the invention forming the subject matter of this application aims to provide a fishing tool which is reliable, durable in use and comparatively cheap to manufacture.

Other objects and advantages will be apparent during the course of the following description.

In the accompanying drawings, forming a part of this application and in which like numerals are employed to designate like parts throughout the same, Figure 1 is a side elevation of the improved fishing tool about to engage the box of a sucker rod.

Figure 2 is a sectional view through the lower portion of the tool, a sucker rod being shown secured within the tool.

Figure 2ª is a vertical sectional view through the upper portion of the tool.

Figure 3 is a detail sectional view illustrating the position assumed by the parts during the entrance of the box of a sucker rod.

Figure 4 is a detail vertical sectional view illustrating the positions occupied by the parts immediately prior to the descent of the locking clips by means of which the box is urged laterally into engagement with the retaining means.

Figure 4ª is a detail vertical sectional view illustrating the locking slip in its rearmost position.

In the drawing wherein for the purpose of illustration is shown a preferred embodiment of the invention the numeral 5 designates a tubular body having a longitudinal socket 6 within which a coiled spring 7 is arranged. Figure 2ª plainly illustrates that the internal diameter of the socket 6 is reduced at the forward end to provide inclined shoulders designed to coact with a plurality of slips 8.

The rear end of the tubular body 5 has connection with a head 9, the said head being provided with a threaded portion 10 to which a lowering means is connected. It is believed to be obvious that when an object such as a sucker rod enters the forward portion of the socket it will move the jaws 8 rearwardly and the withdrawal of the sucker rod is positively prevented because the weight of the sucker rod is utilized to draw the jaws 8 together and more firmly into engagement with the sucker rod.

One of the principal points of novelty in this application resides in the provision of a relatively long tubular object receiving body 12 threaded onto the forward portion of the body 5.

Figure 4 illustrates that the forward end of the tubular object receiver is extended diagonally or is provided with a substantial bevel 14 which forms what might be said to be a scoop by means of which the sucker rod box 15 or the like may be quickly straightened. It frequently happens that the sucker rod to be fished out of the well is tilted against the tubing and a fishing tool cannot be readily engaged with the same. However, with this invention the beveled forward end is capable of being wedged between the sucker rod and the wall of the tubing. It will be observed that the forward end is also beveled inwardly so that the object which has been previously straightened is guided into the tubular object receiver 12.

In case the sucker rod is broken off above the box the box will of course enter the tubular object receiver 12 and engage the forward beveled end of a tongue 18 on the forward end of a tubular slip 20. As the tool is lowered over the sucker rod box the slip 20 continues its rearward movement until the same engages the forward end or annular shoulder of the body 5. The sucker rod now slips off the forward end of the tongue 18 and drops as illustrated in Figures 4 and 2 to a position behind the sucker rod box. As the tongue 18 which is transversely curved drops to the position illustrated in Figure 2 the sucker rod box 15 is moved laterally so that the shoulder 22 formed thereon is engaged with an arcuate series of inwardly beveled teeth 24. The teeth 24 will engage a square shoulder equally as well as a round or curved shoulder. Particular attention is directed to the fact that the teeth will not in any way force the sucker rod box into destructive contact with the slip 12. That is to say, the weight of the sucker rod on the teeth 24 cannot force the box 15 into destructive contact with any part of the fishing tool. Furthermore, the accidental disconnection of the sucker rod from the fishing tool is absolutely prevented by the tongue 18 which extends below the plane of the teeth 24 when in its operative position.

In case the sucker rod is broken below the box the rod will pass up through the tubular object receiver 12 and be engaged by the jaws 8.

In the case of the box 15 the same enters the tubular object receiver 12 and is forced laterally into the elongated opening 30. However, the upper portion of the sucker rod is engaged by a transversely curved guide member and shoulder 32 secured in any suitable manner within the object receiver 12 immediately above the opening 30. The lower edge of the arcuate shoulder 32 and the upper ends of the openings 30 are beveled to guide the sucker rod box or the like into the upper portion of the receiver 12.

It will be seen that the ends of the shoulder or guide 32 engage the longitudinal edges of the transversely curved tongue 18 so as to prevent the tongue from turning. The longitudinal edges of the tongue 18 are at all times in engagement with the ends of the combined stop shoulder and guide 32 because the rear end of the slip 20 engages the forward end of the body 5 before the tongue 18 can move above the shoulders 32. That is to say, the tongue 18 cannot move rearwardly far enough to lose engagement with the combined stop and guide shoulder 32.

In carrying out the invention the lower portion of the object receiver 12 may be case hardened so that the teeth 24 and the adjacent parts may stand the strain incident to operation.

The foregoing illustrates that the invention forming the subject matter of the application is capable of quickly and securely gripping the sucker rod either at the box of the same or on plain portion of the rod. It is also possible to enter the plain portion of the rod into the socket 5 and simultaneously engage the box with the slip 20 and the case 24.

It is to be understood that the form of the invention herewith shown and described is to be taken as a preferred example of the same and that such minor changes in arrangement and construction of parts may be made as will remain within the spirit of the invention and the scope of what is claimed.

Having thus described the invention, what is claimed is:—

1. A fishing tool comprising a tubular body having an elongated opening, a slip of tubular formation slidable in said body and having its forward end provided with a transversely curved tongue arranged opposite said opening and adapted to force objects to be recovered partly into said opening, and a combined stop shoulder and guide limiting the downward movement of said slip and the turning of the same about the axis of said body.

2. A fishing tool for wells comprising an elongated tubular object-receiving body having an opening in one portion thereof, the lower wall of the opening presenting a shoulder engageable with the objects to be recovered, a slip slidable in said body and having a tongue at its forward end opposite said opening and designed to force the objects being recovered onto said shoulder, the upper wall of said opening being inwardly beveled to provide a guide engageable with the objects being recovered to maintain the upper portions of the same within the casing.

3. A fishing tool for wells comprising an elongated tubular object-receiving body having an opening in one portion thereof, the opening having its lower wall constituting a shoulder engageable with the objects being recovered to support the same, a slip having a cylindrical portion slidably fitted in the upper end of the tubular body and having an elongated arcuate tongue snugly fitting the inner periphery of the body opposite the opening thereof and engageable with the objects being recovered to force them against the shoulder, and a combined guide and stop having the form of a section of an annulus and fitted in and secured to the tubular body above the opening thereof, the ends of said combined guide and stop being slidably engaged with the tongue to constrain the same to sliding movement, the upper wall of the combined guide and stop being engageable with the lower end of the cylindrical portion of the slip to limit the downward movement thereof.

CHARLES HENRY BROWN.